United States Patent [19]

Polvani et al.

[11] Patent Number: 5,331,276
[45] Date of Patent: Jul. 19, 1994

[54] APPARATUS FOR PASSIVELY MEASURING THE VELOCITY OF A FERROUS VEHICLE ALONG A PATH OF TRAVEL

[75] Inventors: Donald G. Polvani, Arnold; David G. Ellerbrake, Severna Park, both of Md.

[73] Assignee: Westinghouse Electric Corporation, Pittsburgh, Pa.

[21] Appl. No.: 945,474

[22] Filed: Sep. 16, 1992

[51] Int. Cl.$^5$ .................. G01P 3/50; G08G 1/052
[52] U.S. Cl. ................. 324/160; 324/179; 324/247; 340/941; 364/565
[58] Field of Search ............ 324/160, 163, 178, 179, 324/247, 253–255; 340/941; 364/565; 180/167, 170

[56] References Cited

U.S. PATENT DOCUMENTS 3,721,859  3/1973  Blanyer ............................ 324/179 X

FOREIGN PATENT DOCUMENTS 2056688  3/1981  United Kingdom ................ 324/179

Primary Examiner—Gerard R. Strecker

[57] ABSTRACT

A passive velocity measuring system which includes first and second biaxial fluxgate magnetometers separated by a known distance and oriented precisely with respect to one another and with respect to the path of travel of a ferrous vehicle whose velocity is to be determined. An indication of the velocity of the vehicle is obtained from the ratio of the time derivative of the magnitude of the vehicle's magnetic induction to the negative of the spatial derivative of this same quantity.

10 Claims, 8 Drawing Sheets

5,331,276

APPARATUS FOR PASSIVELY MEASURING THE VELOCITY OF A FERROUS VEHICLE ALONG A PATH OF TRAVEL

BACKGROUND OF THE INVENTION

1. Field of the Invention

The invention generally relates to apparatus which is operable to obtain an indication of the velocity of a vehicle constructed of or containing magnetic material and does so without the need to transmit and receive electromagnetic radiation.

2. Background Information

Various types of electronic devices exist for detecting the velocity of vehicular traffic along a roadway. By way of example, law enforcement agencies utilize hand-held or vehicle mounted devices which project radar or optical signals at an on-coming vehicle, the velocity of which may be determined from the return signal reflected from the vehicle.

The physical presence of a law enforcement officer and vehicle may be communicated to on-coming traffic to thereby defeat the purpose of the apparatus. Furthermore, various devices may be purchased by the driving public to detect such signals thus causing the driver to slow down during the brief period that the driver's vehicle is being "illuminated". Finally, police officers have recently voiced concerns that hand-held radar speed measuring devices may cause cancer in the officers using them.

A need exists therefore for apparatus which can measure the velocity of a vehicle without transmitting any electromagnetic energy which may be detected, and which apparatus may be hidden from view. The present invention provides for a passive velocity measuring system which meets these objectives.

SUMMARY OF THE INVENTION

Apparatus is provided for passively measuring the velocity of a vehicle constructed of, or containing, magnetic (ferrous) material, while the vehicle proceeds along a path of travel. The apparatus includes first and second magnetometers spaced from one another by a certain distance dx, with each operative to produce a plurality of magnetometer signals indicative of the magnetic induction of the vehicle along respective magnetometer axes, as the vehicle travels along its path, in the vicinity of the magnetometers. The apparatus further includes signal processing means which is responsive to the magnetometer signals to derive respective first and second resultant magnetic induction indicative signals, $B_1(x,t)$ and $B_2(x+dx,t)$, indicative of the magnetic induction (B) of the vehicle at the respective locations of the first and second magnetometers at the same instant of time. Having the values of $B_1$ and $B_2$, the signal processing means is also operable to derive the difference between the signals, the difference $B_1 - B_2$, being herein termed $dB_{space}$.

The magnetometer signals are repetitively sampled so as to derive the magnetic induction indicative signals. The signal processing means derives another signal $dB_{time}$ which is the difference in the magnetic induction indicative signal produced by the first magnetometer from one sampling time (t) to a subsequent sampling time (t+dt) this difference being $B_1(x,t+dt) - B_1(x,t)$. All of the derived signals are stored in a memory means and the signal processing means is operable to derive an indication of the velocity of the vehicle from the ratio of: $dB_{time}$ with respect to the sampling period, and $dB_{space}$ with respect to the distance between the magnetometers.

In one embodiment, the storage of the derived signals takes place only after the magnetic induction indicative signal exceeds a predetermined threshold.

For operation where light weight and low power consumption is important, the magnetometers are preferably biaxial fluxgate magnetometers which generate first and second magnetometer signals indicative of the magnetic induction of the vehicle along respective mutually perpendicular first and second axes.

DESCRIPTION OF THE PREFERRED EMBODIMENT

Figure 1:
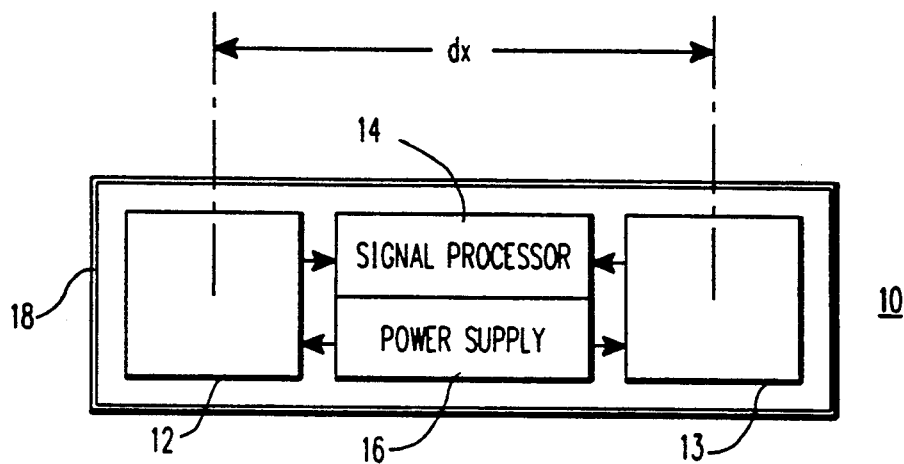
FIG. 1 is a block diagram illustrating one embodiment of the present invention.

Referring now to FIG. 1, the apparatus in accordance with the present invention is comprised of a sensor unit 10 which includes first and second magnetometers 12 and 13 separated by a distance dx. The unit includes signal processing means in the form of signal processor 14 which, along with the magnetometers 12 and 13, are supplied with operating potential from a power supply 16 which for portable unattended operation may be a battery pack. The components are all housed in a weather-proof non-ferrous container 18.

Figure 2:
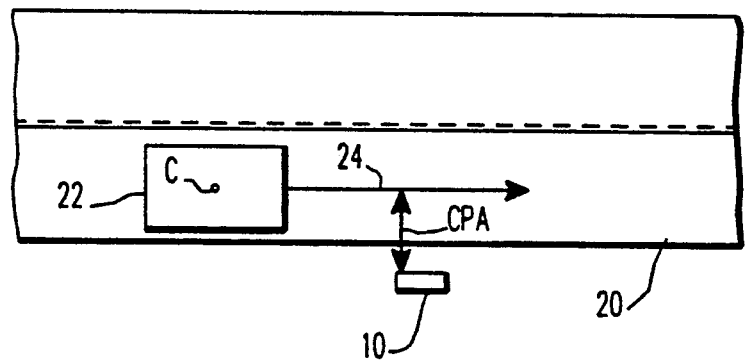
FIG. 2 is a plan view of the apparatus as it may be placed next to a roadway.

The sensing unit may be placed proximate the path of vehicular traffic and FIG. 2 illustrates, by way of example, the placement of the sensing unit 10 by the side of a roadway 20. Numeral 22 represents a ferrous vehicle which, by way of a simple example, is assumed to have a single magnetic dipole at point C and moving along a path of travel represented by arrow 24. The present invention can also effectively measure the velocities of ferrous vehicles whose magnetic induction signal arises from more complicated magnetic sources. The closest point of approach (CPA) of the vehicle 22 (point C) to the sensing unit 10, and more particularly to the first magnetometer thereof, is represented by the arrow CPA.

The first and second magnetometers may be standard triaxial fluxgate magnetometers which will produce three output signals indicative of the vehicle's magnetic induction along three mutually perpendicular (XYZ)

axes. The resultant magnetic induction may then be obtained simply by taking the square root of the sum of the squares of the three signals. However, biaxial fluxgate magnetometers may be preferred in view of the fact that such magnetometers can be smaller and consume relatively little power compared to a triaxial fluxgate magnetometer. Thus biaxial magnetometers are ideal for a compact, lightweight, portable unit which may be easily concealed at the side of the road and which can operate remotely for long periods of time on batteries. The preferred embodiment of the invention will be described, by way of example, using these biaxial fluxgate magnetometers.

Figure 3:
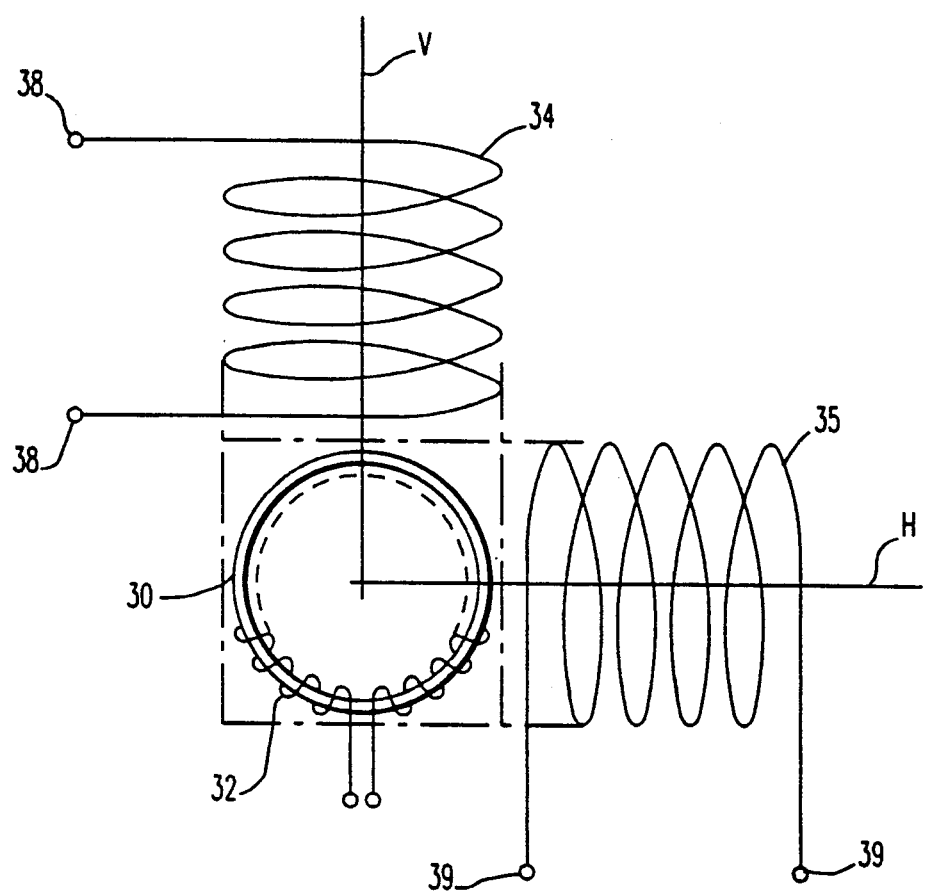
FIG. 3 illustrates some components of a biaxial fluxgate magnetometer which may be used in the arrangement of FIG. 1.

Some basic elements of a biaxial fluxgate magnetometer are illustrated in FIG. 3, wherein the magnetometer includes a magnetometer core 30 around which is wound a drive coil 32. First and second sense windings 34 and 35 are included and are wound around the core 30 in mutually perpendicular directions with the windings having mutually perpendicular axes labeled V and H. The operation of such magnetometers is well known to those skilled in the art and accordingly, the electronics therefore has not been illustrated, it being understood that windings 34 and 35 provide output signals at respective output terminals 38 and 39 indicative of the magnetic induction of a ferrous object along respective V and H axes and of a magnitude dependent upon the size and proximity of the object.

Figure 4:
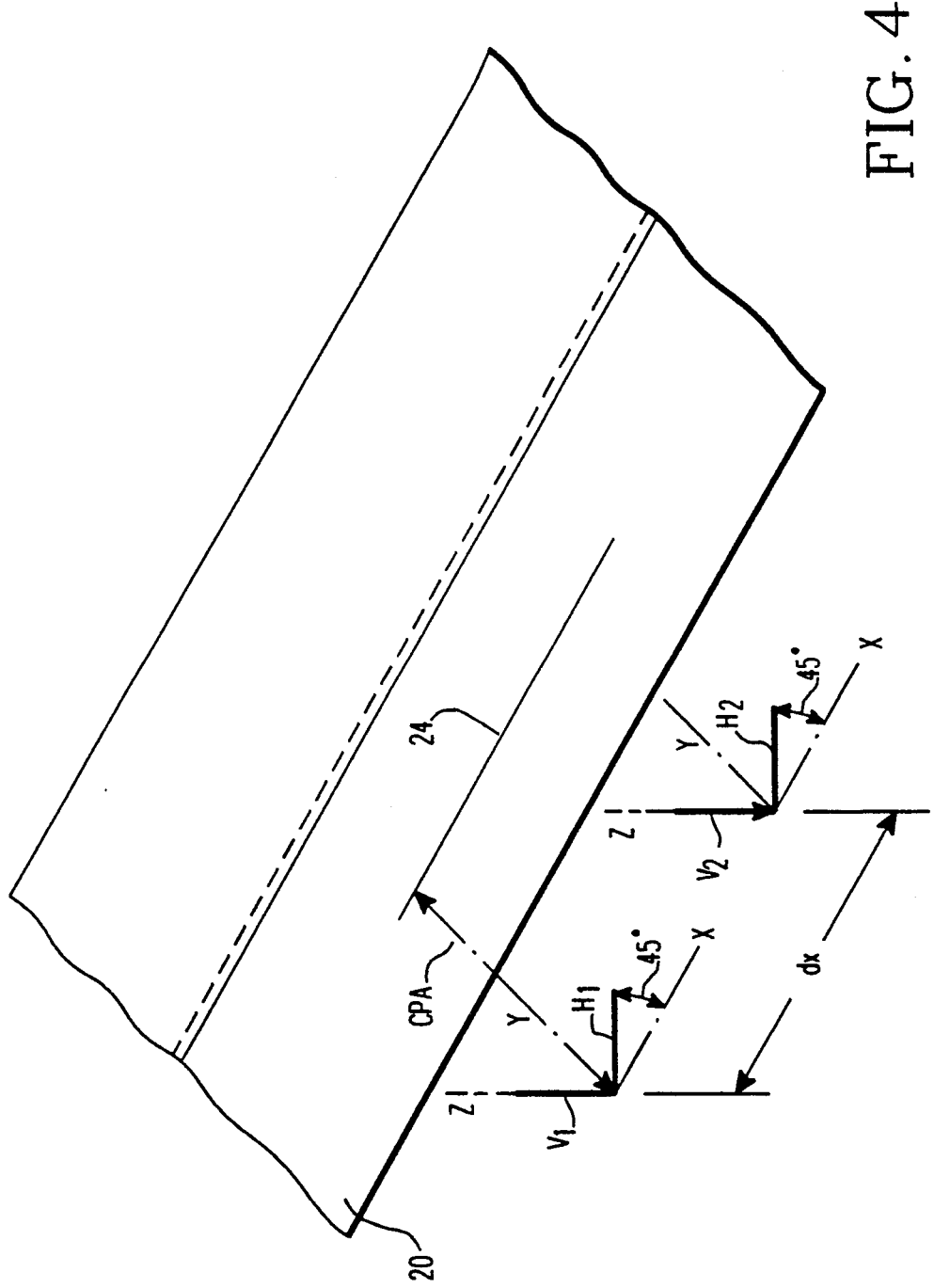
FIG. 4 illustrates the orientation of the magnetometers relative to a roadway.

In the present invention, the magnetometers are precisely positioned relative to one another and relative to the path of travel of the vehicle. Such placement is illustrated in FIG. 4, which shows two XYZ coordinate systems separated by a distance dx corresponding to the distance dx between the magnetometers as illustrated in FIG. 1. Each Y axis is perpendicular to the path of travel 24, each X axis is parallel to it, and each Z axis is vertical. The magnetometer vertical axis V (FIG. 3) for the first magnetometer 12 is designated $V_1$ in FIG. 4 and is coincident with the Z axis as is vertical axis $V_2$ for magnetometer 13. The horizontal axes $H_1$ and $H_2$ of the first and second magnetometers are precisely positioned in the XY plane midway between the X and Y axes, that is, at a 45° angle, as illustrated. Placing the horizontal axis H of the magnetometer at this angle allows it to sense a portion of both the X and Y components of the vehicle's magnetic induction vector which may then be approximated by taking the square root of the sum of the squares of the vertical and horizontal axis magnetometer outputs. As will be seen, the ratio of differences in magnetic induction are utilized in the signal processing, and accordingly, the absolute values of magnetic induction are not required.

Figure 5:
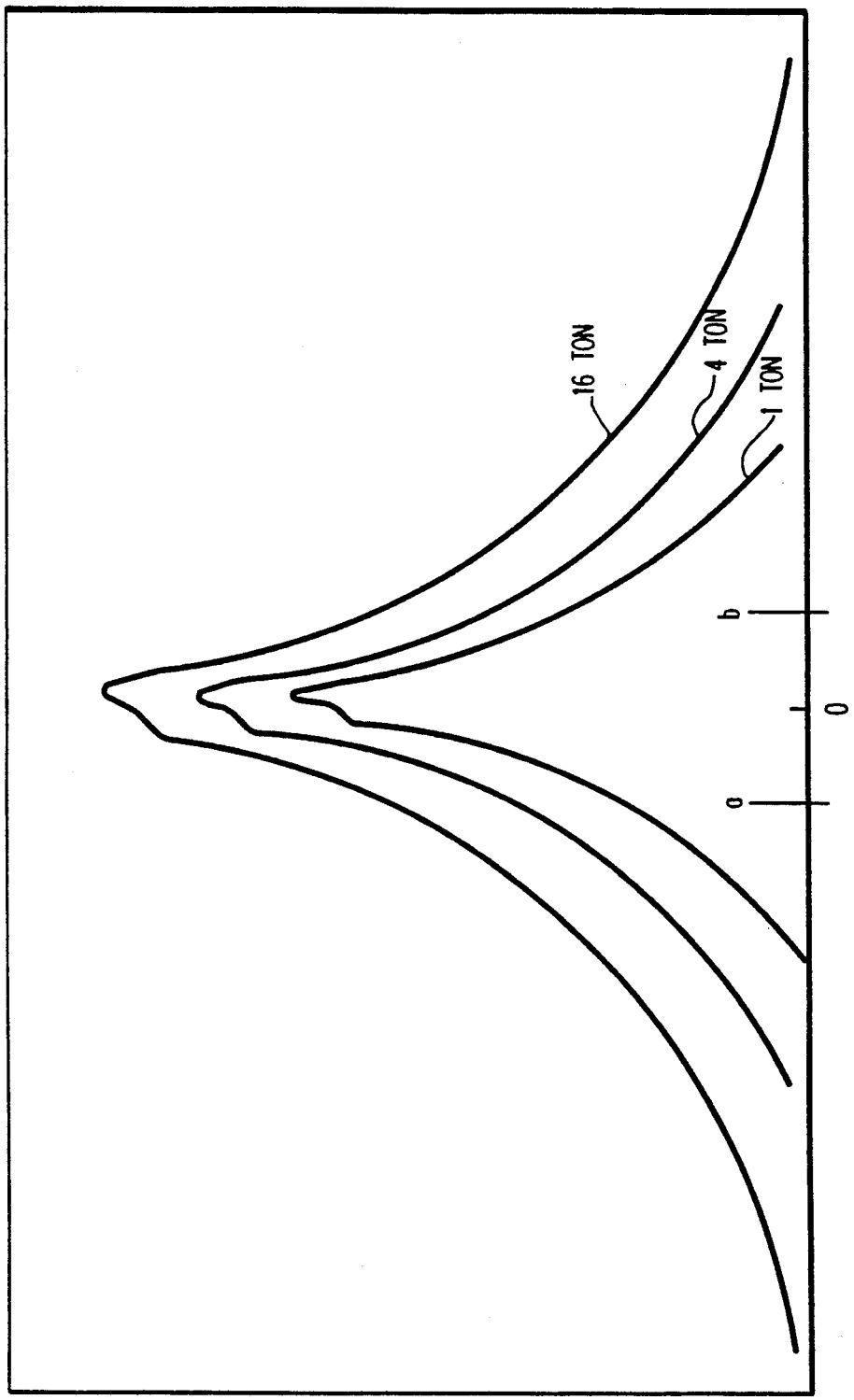
FIG. 5 illustrates typical magnetometer signals for three different sizes of vehicles.

FIG. 5 illustrates typical magnetic induction curves for respective 1, 4 and 16 ton vehicles. The magnetic induction indicative signal calculated from the magnetometer output signals is plotted as magnetic induction on the vertical axis and along road distance is plotted on the horizontal axis with the center of magnetometer 12 of apparatus 10 being located at the mid or zero position. In FIG. 5, the center of the vehicle is located at the closest point of approach. For a vehicle which is moving, the entire magnetic induction curve of the figure also moves in the same direction as the vehicle.

Figure 6:
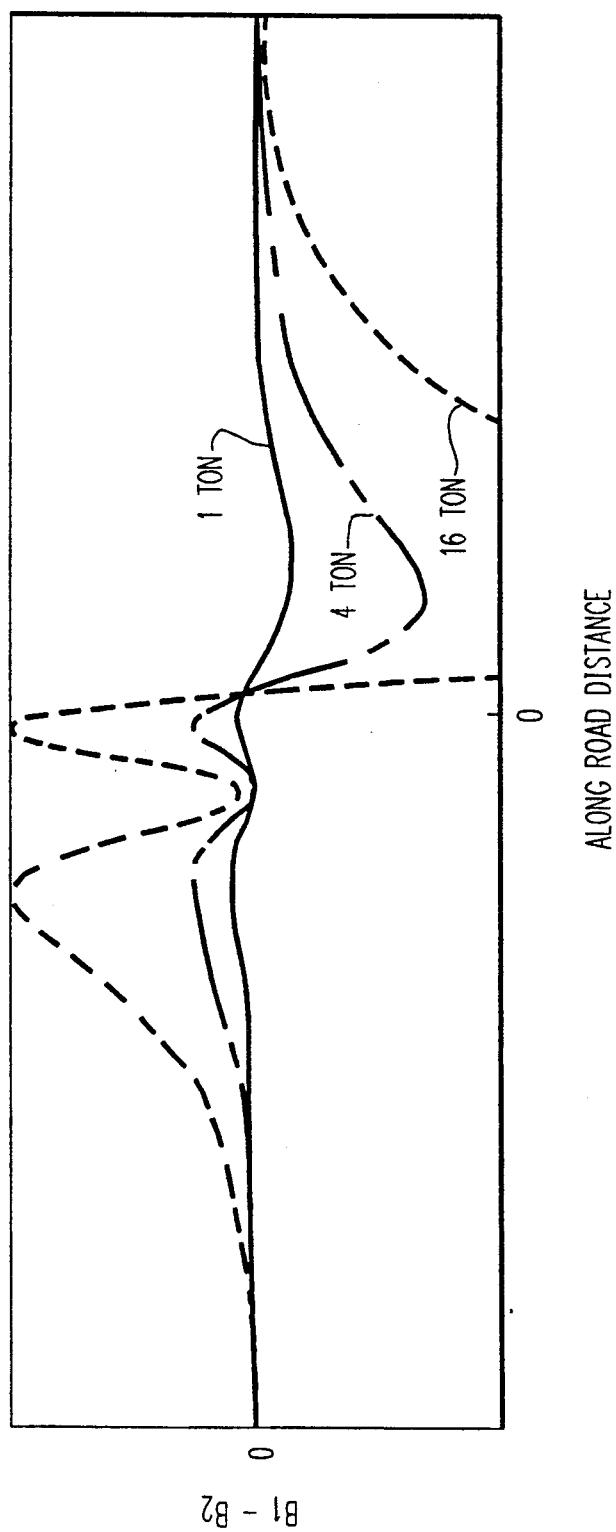
FIG. 6 illustrates the difference in signals provided by the two magnetometers of FIG. 1 in response to the vehicles whose magnetic signatures are illustrated in FIG. 5.

FIG. 6 illustrates the difference in magnetic induction values ($B_1(x,t) - B_2(x+dx,t)$) derived from the outputs of the separated first and second magnetometers, this value being plotted on the vertical axis. The curves of FIG. 6 illustrate the differences for the 1, 4 and 16 ton vehicles plotted in FIG. 5 for magnetic induction values between an arbitrary distance from a to b in FIG. 5. The difference signal, $B_1 - B_2$, will be termed herein $dB_{space}$. The negative of the conventional spatial gradient is produced by dividing $dB_{space}$ by the magnetometer separation dx.

Figure 7:
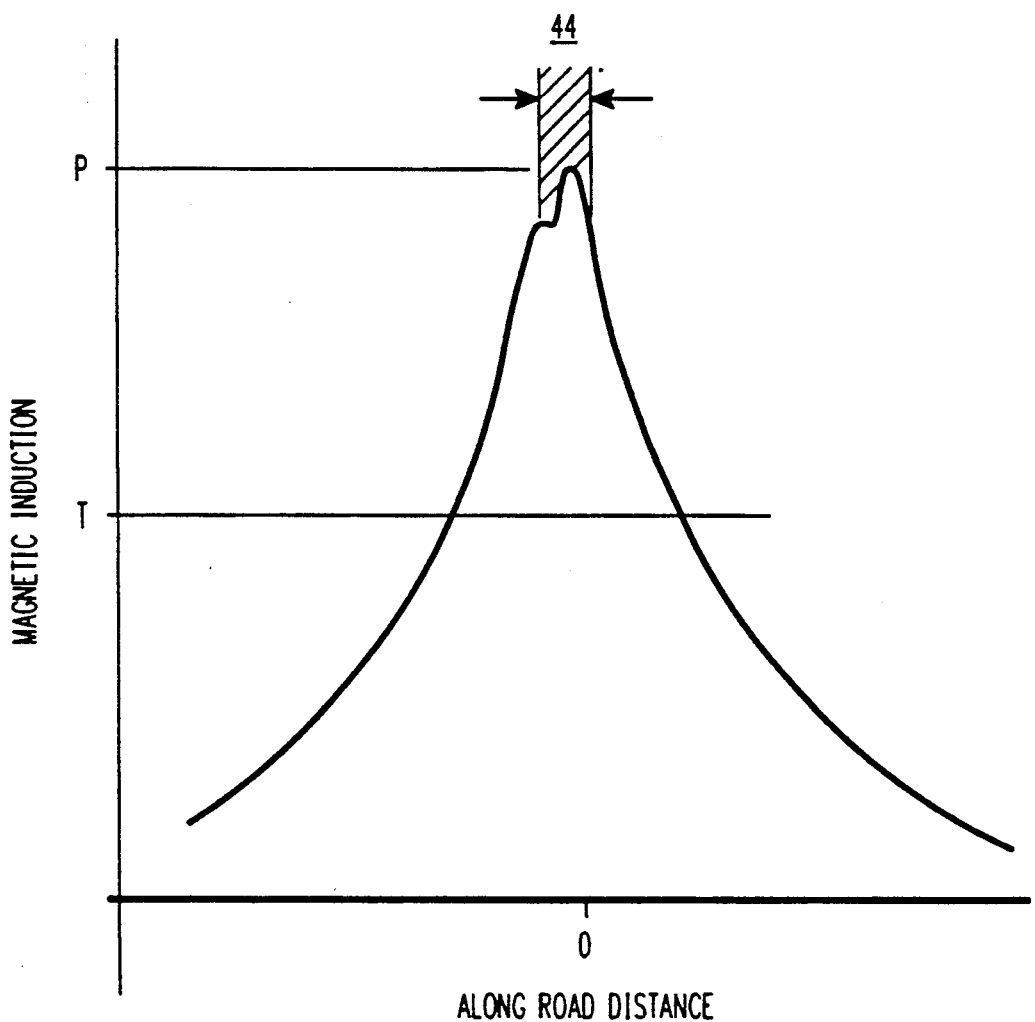
FIG. 7 illustrates a typical magnetometer reading for a vehicle and further illustrates the concept of thresholding.

FIG. 7 illustrates a generic magnetic induction curve, as in FIG. 5, and it is seen that as the vehicle approaches a magnetometer (the center of which is located at the zero value on the horizontal axis), the curve increases to a peak value P and thereafter decreases as the vehicle recedes.

The signal processor 14 is operable to repetitively sample the magnetometer outputs to calculate the magnetic induction indicative signals and to store them for calculation of velocity. In a preferred embodiment, however, such storage of calculated values will take place only after the threshold T has been attained and the storage of the values will continue until the curve drops below the value of T.

In view of the fact that spatial gradients are utilized herein, velocity measurements are made between the times of the two threshold crossings except for a dead zone 44 centered around the CPA point where the magnetic induction spatial gradients are very small, and in fact, are zero at the peak of the signal. This deadzone 44 may be about 10 to 20% of the interval between the two threshold crossings and although magnetic induction values are stored for this deadzone, they are stored simply for determining the peak and are not utilized in the velocity calculations.

Figure 8:
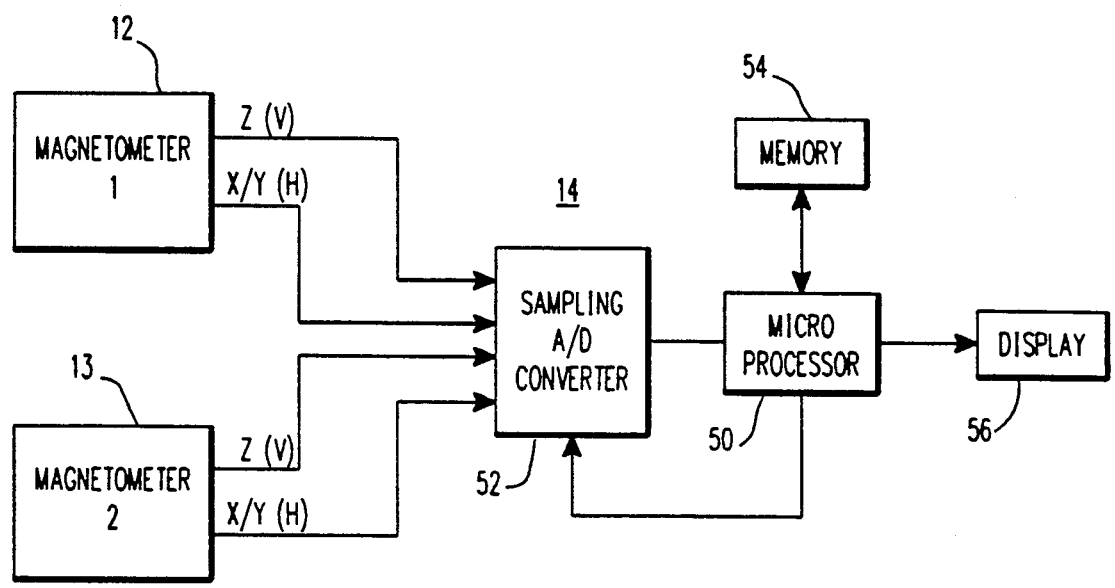
FIG. 8 illustrates a block diagram of the apparatus for determining the velocity.

FIG. 8 illustrates some of the components of FIG. 1 in more detail. Operation of the apparatus is governed by a microprocessor 50 which periodically causes the sampling analog to digital converter 52 to sample the output signals from magnetometers 12 and 13 and convert them to digital form, whereupon microprocessor 50 will calculate magnetic induction values and place them into storage in memory 54 if the values exceed the threshold level. After velocity calculations have been made, the results may be provided to a utilization device such as a display 56 which may be remote from the apparatus. Velocity indications may be displayed in real time for individual vehicles, or they may be stored and used at a later date for traffic analysis, by way of example.

The velocity V of the vehicle is determined from the following equation:

$$V = \frac{\frac{dB_{time}}{dt}}{\frac{dB_{space}}{dx}} \qquad (1)$$

where the numerator represents the time derivative of the magnetic induction value B and the denominator is the negative of the spatial gradient of B in the X direction. The time derivative of B is obtained from the difference in time sequential measurements ($dB_{time}$) at the first magnetometer and dividing by the sampling interval dt. The denominator is obtained by obtaining the difference in simultaneous outputs of the two magnetometers ($dB_{space}$) and dividing by their spatial separation dx, where dx is the same as that indicated in FIGS. 1 and 4.

The two magnetometers 12 and 13 must be spaced close enough so that the resultant magnetic induction difference signal approximates the negative of the spatial gradient of the magnitude of the magnetic induction. To accomplish this, the spacing (dx) between the two magnetometers should be no more than about 1/10th of the range to the vehicle at the closest point of approach. For example, if the closest point of approach is 6 meters, the magnetometer spacing should be equal to or less than 0.6 meters. However, the smaller the magnetometer spacing becomes, the smaller the difference signals become. Tests have shown that a spacing of 0.2 meters meets the requirement for measuring a good approximation to the spatial gradient, produces usable signal levels, and yields a compact size sensor unit.

The sampling period may be initially selected with a view toward the maximum velocity to be encountered. For example, for a maximum speed of 150 kilometers per hour, the initial sampling time may be selected to have a period of 0.005 seconds for a magnetometer spacing of 0.2 meters as can be computed from Equation (3) below. The most accurate results are achieved when the time difference, dt, between the two samples used to form the time derivative produces a differential magnetic induction, $dB_{time}$, which is equal to the differential produced by the spatial separation, dx, between the two magnetometers, $dB_{space}$. That is, ideally:

$$dB_{time} = dB_{space} \quad (2)$$

For this condition, the vehicle's velocity is given simply by:

$$V = \frac{dx}{dt} \quad (3)$$

Figure 9C:
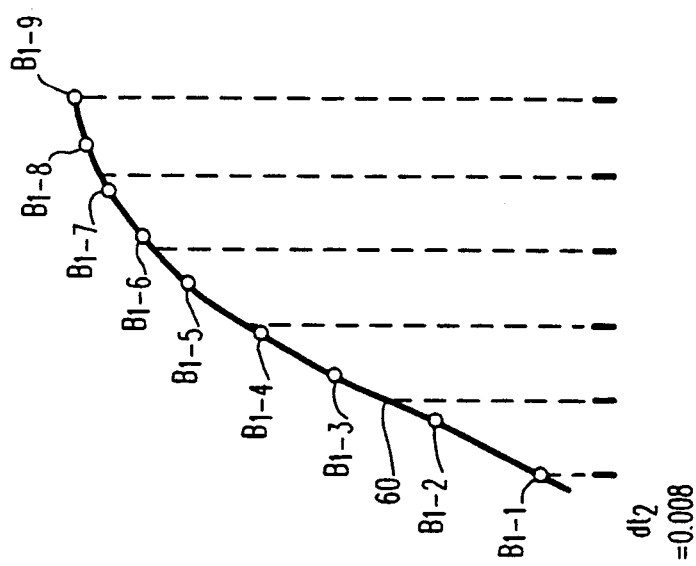
FIGS. 9A-9C illustrate the sampling, and reading of stored values.
Figure 9B:
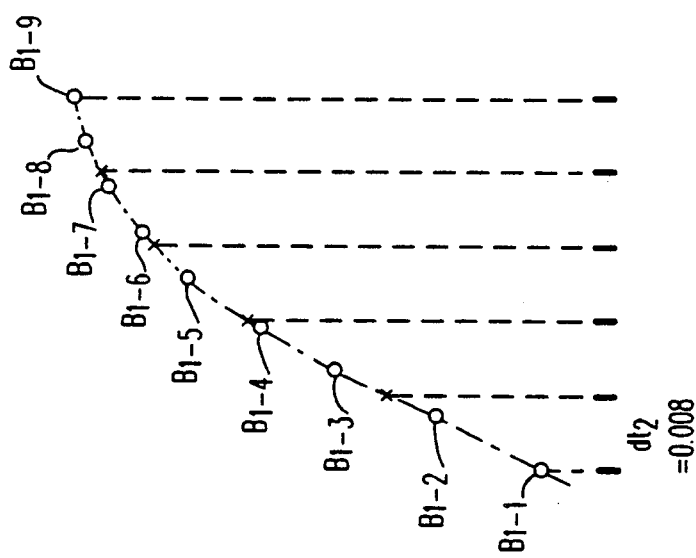
Figure 9A:
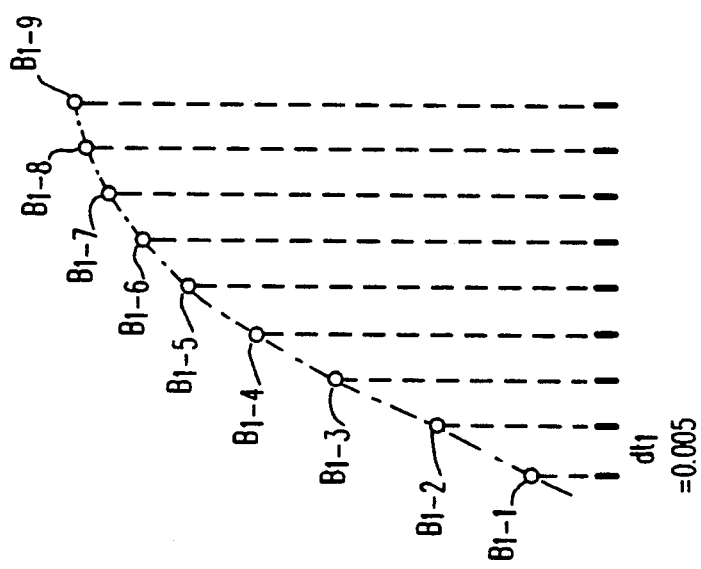

With additional reference to FIG. 9A, the magnetometer output signals are sampled every $dt_1$ seconds where, in the example, $dt_1$ is 0.005 seconds. The value $B_{1-1}$ in FIG. 9A represents the first calculated magnetic induction indicative signal derived from the output signals of the first magnetometer and which value exceeds the predetermined threshold. At the next sampling, 0.005 seconds later, a second value $B_{1-2}$ is calculated and stored and the process is repeated every 0.005 seconds until the calculated value drops below the threshold. It is to be noted that FIG. 9A illustrates 9 stored values out of a total of n and that the exact same procedure is occurring with respect to the output signals provided by the second magnetometer.

For each stored value, $dB_{time}$ and $dB_{space}$ are calculated and utilized in equation 1 to derive an average velocity V which is the total of all the calculated velocities divided by n. For some purposes, this value obtained for the velocity will be of sufficient accuracy. However, any error may be decreased by utilizing the calculated value for velocity in equation (3) and solving for a new dt. The new value of dt may then be used for sampling, as in equation (1) and the process repeated. FIGS. 9B and 9C illustrate two different methods wherein the previously calculated magnetic induction values may be utilized with a new period $dt_2$ which for purpose of example will be 0.008 seconds (corresponding to a speed of 90 Km/hr for 0.2 meter magnetometer spacing). From FIG. 9B, it is seen that the first value of magnetic induction $B_{1-1}$ may be utilized, however, there is no stored value corresponding to the next sampling time $dt_2$ 0.008 seconds later. In such instance, the closest value, $B_{1-3}$, may be utilized. For the third sampling, stored value $B_{1-4}$ is closest to the time occurrence of the third sampling whereas in the fourth sampling, $B_{1-6}$ will be utilized. The process is continued as before for calculating velocity and an average velocity is obtained which again may be within desired accuracy limits.

A second and somewhat more accurate method of calculating the new average velocity is illustrated in FIG. 9C wherein values between stored values may be interpolated such that for each sampling at $dt_2$ a value of curve 60 may be generated for velocity calculations.

The new average velocity calculated will again be utilized in equation (3) to derive a new dt and the process may continue until a new calculated velocity differs from a previously calculated velocity by 1 or 2%, by way of example.

Accordingly, there has been described apparatus which passively obtains the velocity of ferrous vehicles utilizing the ratio of the time derivative of the magnitude of an indication of the vehicle's magnetic induction to the negative of the spatial derivative of the same quantity. For particular applications, the apparatus may be of small size and weight due to the utilization of compact magnetometers and will consume relatively low power with the use of biaxial fluxgate magnetometers. The portability and size of such unit lends itself to covert operations. Although the sensing unit has been described as being placed beside a road carrying vehicular traffic, it could be placed in other positions relative to the traffic such as above the traffic in tunnels and on bridges. Further, the device can be used for obtaining the velocity of any ferrous vehicle such as ship traffic.

We claim:

1. Apparatus for passively measuring the velocity of a ferrous vehicle along a path of travel, comprising:
   a) first and second magnetometers located adjacent said path of travel and spaced from one another by a distance dx along a line essentially parallel to said path of travel with each said magnetometer being operable to produce a plurality of magnetometer signals indicative of the magnetic induction of said vehicle along respective magnetometer axes, as said vehicle travels along said path in the vicinity of said magnetometers;
   b) signal processing means responsive to said magnetometer signals to derive respective simultaneous first and second resultant magnetic induction indicative signals, $B_1$ and $B_2$, indicative of the magnetic induction of said vehicle at the respective location of said first and second magnetometers, and being further operable to derive the difference, $B_1 - B_2 = dB_{space}$, between said signals;
   c) said signal processing means being operable to repetitively sample said magnetometer signals to derive said magnetic induction indicative signals;
   d) said signal processing means being operable to drive the difference, $dB_{time}$, in magnetic induction indicative signals from one said sampling to a subsequent sampling, for the first of said magnetometers;
   e) memory means for storing derived signals;
   f) said signal processing means being responsive to said stored signals and operable to derive an indication of the velocity of said vehicle from the ratio of: $dB_{time}$ with respect to the sampling period, and $dB_{space}$ with respect to the distance between said magnetometers.

2. Apparatus according to claim 1 wherein:
   a) said signal processing means is operable to store said signals only if the value of a selected one of said resultant magnetic induction indicative signals exceeds a predetermined threshold.

3. Apparatus according to claim 1 wherein:
a) said magnetic induction indicative signal rises to a peak as said vehicle approaches said apparatus and thereafter decreases as said vehicle recedes; and wherein
b) said signal processing means is operable to calculate said velocity, disregarding all stored signals representing a dead zone around said peak.

4. Apparatus according to claim 3 wherein:
a) said signal processing means is operable to store said signals only if the value of a selected one of said resultant magnetic induction indicative signals exceeds a predetermined threshold; and
b) said dead zone extends on either side of said peak by an amount proportional to the distance between threshold crossings of said magnetic induction indicative signal.

5. Apparatus according to claim 1 wherein:
a) said signal processing means is operable to calculate a plurality of said velocity indications using said stored signals and to thereafter derive an average velocity indication from said plurality.

6. Apparatus according to claim 5 wherein:
a) said sampling period is initially chosen to be $dt_1$; and wherein
b) said signal processing means is operable to derive a new sampling period, $dt_2$ from the relationship $dt_2 = dx/v$, where v is said average velocity indication, and to thereafter calculate a new average velocity indication utilizing $dt_2$.

7. Apparatus according to claim 6 wherein:
a) said signal processing means is operable to derive new sampling periods and new average velocity indications until two successively calculated velocity indications are within a predetermined percentage of one another.

8. Apparatus according to claim 1 which includes:
a) a non-ferrous case;
b) said first and second magnetometers and said signal processing means being contained within said case.

9. Apparatus according to claim 1 wherein:
a) said first and second magnetometers are biaxial fluxgate magnetometers having first and second axes;
b) said first and second magnetometers being oriented such that the first axis of each said magnetometer is vertical and the second axis of each said magnetometer is at a 45° angle with respect to said path of travel.

10. Apparatus according to claim 1 wherein:
a) the closest point of approach of said vehicle to said apparatus = CPA; and
b) $dx \leq 0.1$ (CPA).

* * * * *